United States Patent
Ito et al.

(10) Patent No.: US 8,241,435 B2
(45) Date of Patent: Aug. 14, 2012

(54) APPARATUS AND METHOD FOR WASHING ELECTRODE PLATE CORE FOR ALKALINE BATTERY

(75) Inventors: Shinichiro Ito, Kosai (JP); Atsushi Adachi, Kosai (JP); Yasufumi Tanaka, Toyohashi (JP)

(73) Assignee: Panasonic EV Energy Co., Ltd., Kosai-Shi, Shizuoka (JP)

( * ) Notice: Subject to any disclaimer, the term of this patent is extended or adjusted under 35 U.S.C. 154(b) by 944 days.

(21) Appl. No.: 12/239,625

(22) Filed: Sep. 26, 2008

(65) Prior Publication Data
US 2009/0084404 A1 Apr. 2, 2009

(30) Foreign Application Priority Data
Sep. 28, 2007 (JP) ................. 2007-254863

(51) Int. Cl.
*G03D 3/13* (2006.01)
(52) U.S. Cl. ...... 134/122 R; 134/15; 134/198; 204/198; 204/206

(58) Field of Classification Search .................. 204/199, 204/202, 212
See application file for complete search history.

(56) References Cited

U.S. PATENT DOCUMENTS
| | | | |
|---|---|---|---|
| 6,419,756 B1 * | 7/2002 | Schlechter | 134/15 |
| 2005/0115037 A1 * | 6/2005 | Adachi et al. | 29/2 |
| 2009/0260979 A1 * | 10/2009 | Saitou | 204/212 |

FOREIGN PATENT DOCUMENTS
| | | |
|---|---|---|
| JP | 2004-071534 | 3/2004 |

* cited by examiner

*Primary Examiner* — Michael Barr
*Assistant Examiner* — Caitlin N Dunlap
(74) *Attorney, Agent, or Firm* — Workman Nydegger

(57) ABSTRACT

A washing apparatus that easily washes off metal impurities from a porous metal substrate used as an electrode plate core for an alkaline battery. The washing apparatus includes a liquid bath container which holds a solution for washing off the metal impurities. A guide guides movement of the porous metal substrate in the solution held in the liquid bath container. The porous metal substrate is wound into a hoop in a coil-shaped manner, and the guide guides the movement of a sheet portion of the porous metal substrate unwound from the hoop. A winding mechanism winds the sheet portion after being fed through the liquid bath container.

11 Claims, 6 Drawing Sheets

APPARATUS AND METHOD FOR WASHING ELECTRODE PLATE CORE FOR ALKALINE BATTERY

CROSS-REFERENCE TO RELATED APPLICATIONS

This application is based upon and claims the benefit of priority from the prior Japanese Patent Application No. 2007-254863, filed on Sep. 28, 2007, the entire contents of which are incorporated herein by reference.

BACKGROUND OF THE INVENTION

The present invention relates to an apparatus and method for washing an electrode plate core for an alkaline battery and a method for manufacturing an alkaline battery that has undergone such a washing method.

As known in the art, alkaline batteries, such as a nickel-cadmium battery and a nickel-metal hydride battery, are widely used as power supplies for portable information terminals, vehicles, or the like. The positive electrode in each of the above alkaline batteries includes a conductive core and an active material, which is carried by the core. The core may be a foam nickel substrate or a porous metal substrate, which is formed from a sintered alloy.

When manufacturing the porous metal substrate, which is used to form the electrode plate core, metals other than nickel and iron (e.g., copper) may mix in the electrode plate core as impurities. If the amount of the mixed metal impurities is large, such metal impurities may dissolve from the core into an electrolytic solution and deposit in the solution. This may cause fine short-circuiting between the positive and negative electrode.

Accordingly, in the prior art, Japanese Laid-Open Patent Publication No. 2004-71534 describes a technique for washing off metal impurities when manufacturing the electrode plate core. In this publication, the washing of the electrode plate core is performed as described below.

The porous metal substrate used as the electrode plate core is wound in a coil-shaped manner as a hoop. In the above publication, as shown in FIG. 1, a hoop 50 of a porous metal substrate is immersed into an aqueous solution 51 containing ammonium ions and hydrogen peroxide to wash off copper, which is a metal impurity.

In this manner, in the prior art, a great amount of an electrode plate core can be washed in hoops. However, in a hoop that is wound in a coil-shaped manner, the bonding rate at the central portion of the hoop is high. Thus, it becomes difficult for the washing solution to enter and sufficiently wash the central portion. As a result, the hoop must be immersed in the solution for a long period of time so that the solution can enter the central portion of the porous metal substrate and wash off the metal impurities.

Most of the hydrogen peroxide in the solution decomposes when the temperature of the solution rises to about 35° C. Thus, the temperature of the solution must be accurately controlled during the washing. However, in the above-described technique of the prior art, exothermic heat generated by chemical reactions is large since a great amount of the electrode plate is washed in hoops with the solution. As a result, the controlling of the temperature is difficult.

SUMMARY OF THE INVENTION

The present invention provides an apparatus and method for washing an electrode plate core that easily washes off metal impurities from a porous metal substrate used as an electrode plate core and a method for manufacturing an alkaline battery that undergoes such a washing method.

One aspect of the present invention is a washing apparatus for washing off a metal impurity from a porous metal substrate for use as an electrode plate core for an alkaline battery. The washing apparatus includes a liquid bath container which holds a solution for washing off the metal impurity. A guide guides movement of the porous metal substrate in the solution held in the liquid bath container. The porous metal substrate is wound into a hoop in a coil-shaped manner, and the guide guides the movement of a sheet portion of the porous metal substrate unwound from the hoop. A winding mechanism winds the sheet portion fed through the liquid bath container.

A further aspect of the present invention is a method for washing off a metal impurity from a porous metal substrate for use as an electrode plate core for an alkaline battery. The method includes feeding the porous metal substrate into a liquid bath container including a solution for washing the metal impurity. The porous metal substrate is wound into a hoop in a coil-shaped manner, and a sheet portion of the porous metal substrate is unwound from the hoop and fed into the solution in the liquid bath container. The method also includes winding the sheet portion that has been fed through the liquid bath container.

Another aspect of the present invention is a method for manufacturing an alkaline battery including a core formed from a porous metal substrate and carrying an active material to function as a positive electrode. The method includes washing the core, which includes feeding the porous metal substrate into a liquid bath container including a solution for washing the metal impurity, with the porous metal substrate being wound into a hoop in a coil-shaped manner, and a sheet portion of the porous metal substrate being unwound from the hoop and fed into the solution in the liquid bath container. The washing of the core also includes winding the sheet portion that has been fed through the liquid bath container.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

Figure 1:
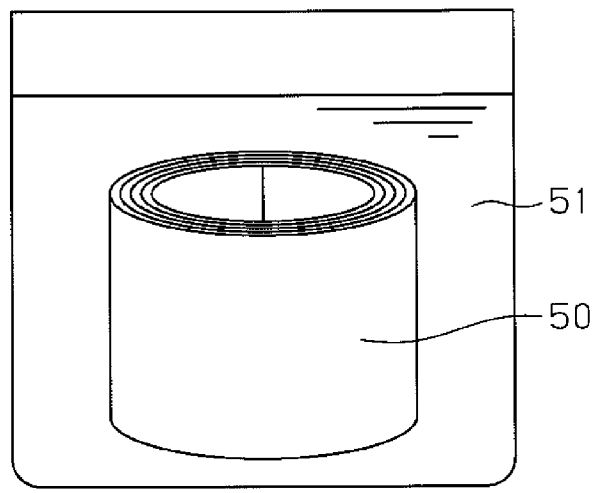
FIG. 1 is a schematic view showing a method for washing an electrode plate core in the prior art.

In the drawings, like numerals are used for like elements throughout.

First Embodiment

A first embodiment of a washing apparatus according to the present invention will now be discussed in detail with reference to FIGS. 2 to 5.

In the first embodiment, an apparatus for washing an electrode plate core performs washing to remove copper from a porous metal substrate, such as foam nickel substrate or sintered alloy substrate. Copper is mixed as a metal impurity in the porous metal substrate. The porous metal material is used as the core of a positive electrode plate for an alkaline battery. In this washing apparatus, an aqueous solution containing ammonium ions and hydrogen peroxide solution is used as a solution for washing off copper. The use of such an aqueous solution effectively removes copper from the porous metal substrate.

In the case of a nickel-metal hydride battery, ammonium ions contained in the aqueous solution, which washes off copper, may remain in the porous metal substrate as ammonia. The ammonia becomes ammonium hydroxide in the electrolytic solution that reduces nickel oxyhydroxide of the positive electrode and generates nickel hydroxide. The ammonia is oxidized on the positive electrode and transformed to nitrogen oxide ion and diffused on a negative electrode. The nitrogen oxide ion diffused on the negative electrode causes a hydrogen desorption reaction of a hydrogen occlusion alloy. The nitrogen oxide is then reduced and returned to ammonium ions. The repeating of such reactions increases the amount of self-discharge and the lowers the performance of the battery. The chemical reaction formula of the positive electrode and the negative electrode during self-discharge is as shown below.

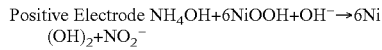

Positive Electrode $NH_4OH+6NiOOH+OH^- \rightarrow 6Ni(OH)_2+NO_2^-$

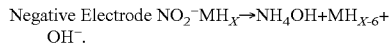

Negative Electrode $NO_2^-MH_X \rightarrow NH_4OH+MH_{X-6}+OH^-$.

In the first embodiment, in order to avoid such a drawback, after washing off copper, the porous metal substrate is sprayed with pure water, which serves as washing liquid. This washes off residual components of the solution from the porous metal substrate. The porous metal substrate is then dried to remove the remaining washing liquid on the substrate. This completes the series of washing processes.

Figure 2:
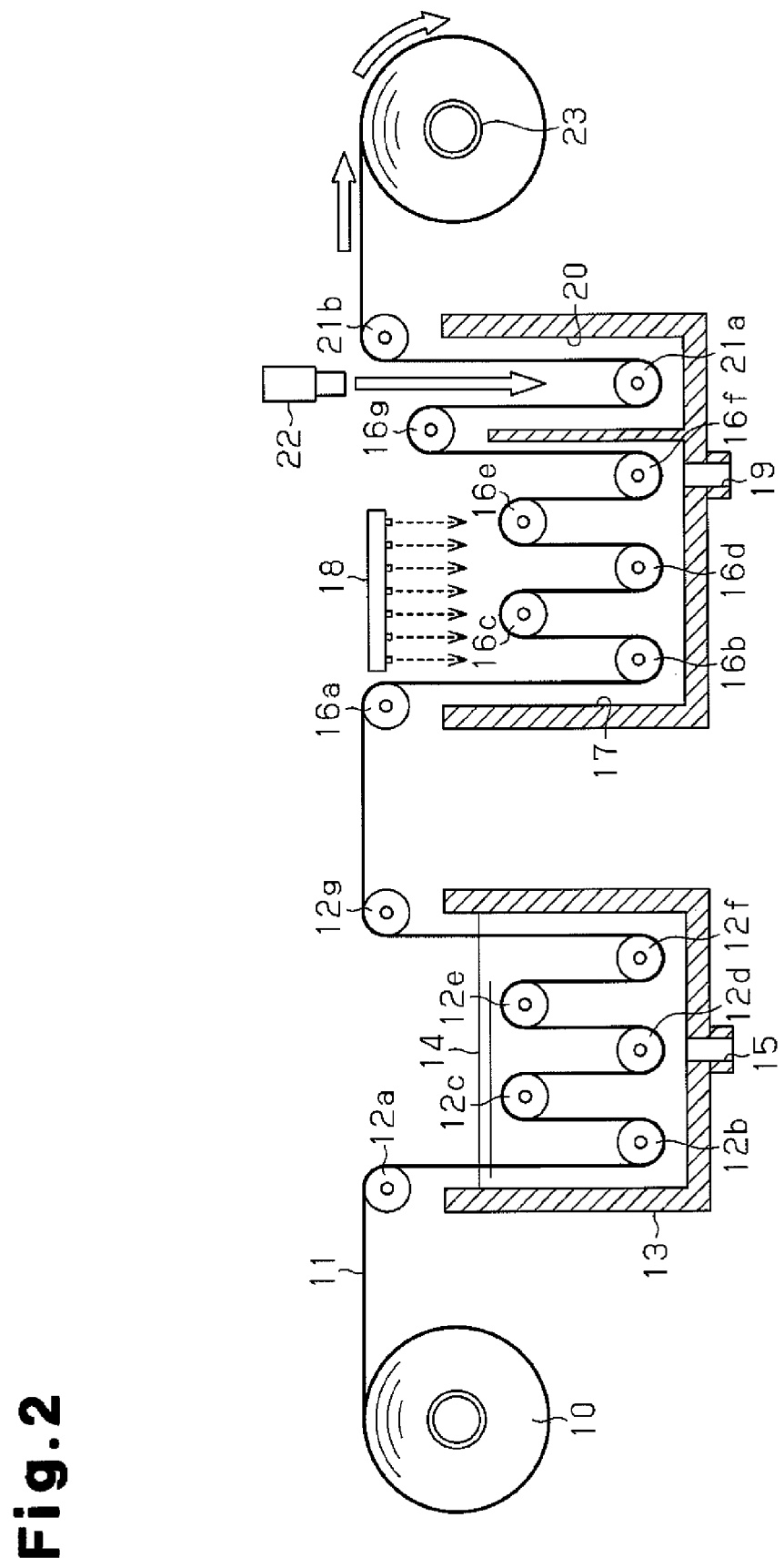
FIG. 2 is a schematic diagram showing a first embodiment of an apparatus for washing an electrode plate core according to the present invention.

FIG. 2 shows the structure of the first embodiment of an apparatus for washing an electrode plate core. The washing apparatus washes off metal impurities, washes off the remaining solution, and dries the substrate. A porous metal substrate, which is the washing subject of the washing apparatus, is provided as a hoop 10 wound in a coil-shaped manner.

As shown in the drawing, a sheet portion 11 of the porous metal substrate unwound from the hoop 10 is first wound onto a pulley 12a and then sent into a liquid bath container 13. The liquid bath container 13 holds an aqueous solution 14 containing ammonium ions and hydrogen peroxide solution. A drain 15 for drawing out the aqueous solution 14 is arranged at the bottom of the liquid bath container 13.

Five pulleys 12b to 12f are arranged in the liquid bath container 13. The sheet portion 11 is sequentially fed up and down in an alternate manner over the three pulleys 12b, 12d, and 12f, which are located at the lower portion of the liquid bath container 13, and the two pulleys 12c and 12e, which are located at the upper portion of the liquid bath container 13. Thus, the pulleys 12b to 12f move the sheet portion 11 back and forth three times in the aqueous solution 14 between upward and downward positions. In the washing apparatus of the first embodiment, the pulleys 12b to 12f serves as a guide for guiding the movement of the sheet portion 11 of the porous metal substrate unwound from the hoop 10 through the solution in the liquid bath container 13.

The sheet portion 11 fed through the liquid bath container 13 is wound onto a pulley 12g and a pulley 16a and then sent into a washing bath container 17. Five pulleys 16b to 16f are arranged in the washing bath container 17. The sheet portion 11 is sequentially fed up and down in an alternate manner over the three pulleys 16b, 16d, and 16f, which are located at the lower portion of the washing bath container 17, and the two pulleys 16c and 16e, which are located at the upper portion of the washing bath container 17. Thus, the pulleys 16b to 16f guide and move the sheet portion 11 back and forth three times in the washing bath container 17 between upward and downward positions.

A pipe 18 for supplying washing liquid, which washes off solution from the sheet portion 11, is arranged above the washing bath container 17. The pipe 18 includes a plurality of spray ports from which the washing liquid is sprayed into the washing bath container 17. In the washing apparatus, pure water is used as the washing liquid sprayed into the washing bath container 17. A collection port 19 is formed in the bottom of the washing bath container 17 so that the washing liquid can be collected from the collection port 19. In the first embodiment, the pipe 18 for the washing bath container 17 serves as a spray unit for spraying washing liquid to wash off the solution from the sheet portion 11, which is fed from the liquid bath container 13.

The sheet portion 11 fed through the washing bath container 17 is wound onto a pulley 16g and then sent into a drying bath container 20. In the drying bath container 20, the sheet portion 11 is wound around a pulley 21a and moved back and forth through the drying bath container 20 between upper and lower locations. A blower 22, which blasts out air, is arranged above the drying bath container 20. The blower 22 blasts air against the sheet portion 11 that is fed through the drying bath container 20. The sheet portion 11 fed through the drying bath container 20 is wound onto pulley 21b. Then, a winding mechanism 23 winds the sheet portion 11. In the first embodiment, the blower 22 for the drying bath container 20 serves as a drying unit for drying (i.e., removing washing liquid from) the sheet portion 11 by blasting air against the sheet portion 11 that has been sprayed with the washing liquid.

The process for washing the porous metal substrate with the washing apparatus in the first embodiment will now be discussed. In the washing apparatus, the sheet portion 11 that is unwound from the hoop 10 is sequentially fed through the liquid bath container 13, the washing bath container 17, and the drying bath container 20, and then wound by the winding mechanism 23.

The sheet portion 11 of porous metal substrate unwound from the hoop 10 is first fed through the aqueous solution 14 in the liquid bath container 13. This continuously washes off copper from the sheet portion 11 with the aqueous solution 14 in the liquid bath container 13. In this case, the porous metal substrate is immersed in the aqueous solution 14 in the form of a sheet portion and thus thoroughly and uniformly washed.

Most of the hydrogen peroxide in the aqueous solution 14 is decomposed when the temperature of the aqueous solution rises to about 35° C. Thus, the temperature of the aqueous solution 14 must be accurately controlled. In the first embodiment, the porous metal plate immersed in the aqueous solution 14 is just one part of the hoop 10. Thus, the exothermic heat generated by chemical reaction is small. This facilitates the temperature management of the aqueous solution 14.

Figure 3:
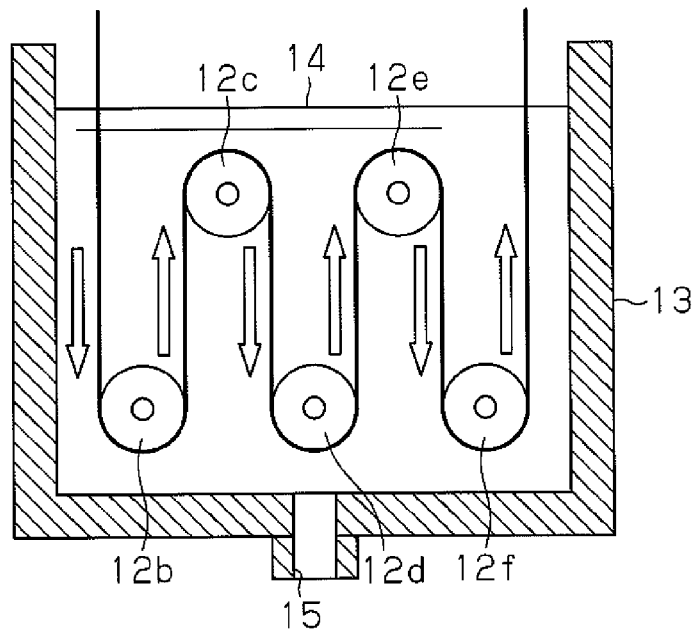
FIG. 3 is a schematic diagram showing movement of a sheet portion of porous metal substrate in a liquid bath container of the washing apparatus shown in FIG. 2.

In the first embodiment, the sheet portion 11 of porous metal substrate moves back and forth through the aqueous solution 14 between upper and lower positions over a plural number of times (three times). Referring to FIG. 3, the sheet portion 11, which is porous and has a high porosity, produces a relatively strong liquid current in the surrounding aqueous solution 14 when moving in the aqueous solution 14. Thus, by moving the sheet portion 11 back and forth over a number of times, the aqueous solution 14 is effectively agitated. Thus, in the washing apparatus, the aqueous solution 14 is agitated such that the ammonium ions and the hydrogen peroxide, which are washing components, are in a uniform concentration distribution. Therefore, a rotor blade or the like does not have to be used to agitate the aqueous solution 14.

Figure 4:
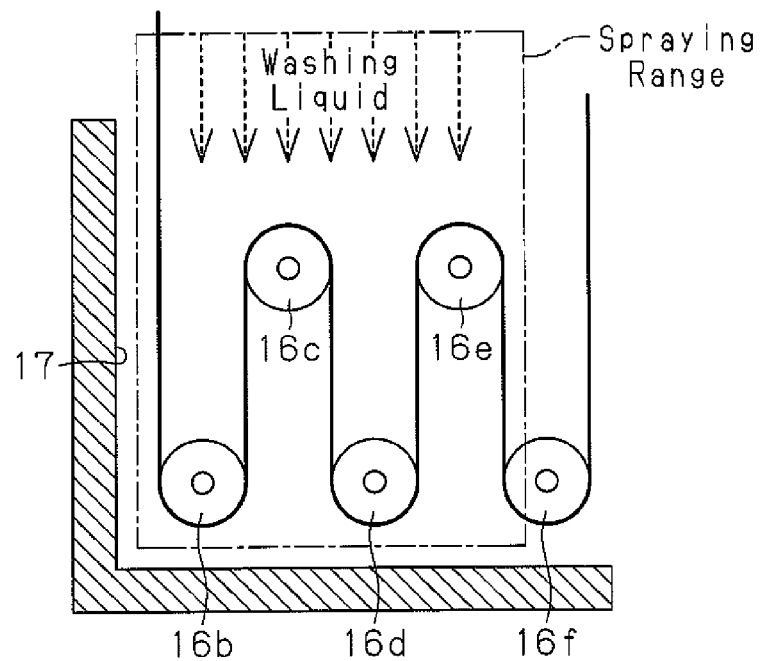
FIG. 4 is a schematic diagram showing a process for spraying liquid in a washing bath container of the washing apparatus shown in FIG. 2.

The sheet portion 11 immersed in the aqueous solution 14 is subsequently sent to the washing bath container 17 and sprayed with washing liquid (pure water). This washes off the aqueous solution 14 from the sheet portion 11. In the first embodiment, the pulleys 16b to 16f move the sheet portion 11 back and forth between upper and lower positions within the washing liquid spraying range. Therefore, the washing liquid sprayed against the sheet portion 11 as shown in FIG. 4 flows along the surface of the sheet portion 11. This increases the time of contact between the washing liquid and the sheet portion 11 and improves the efficiency for washing off the residual components of the aqueous solution 14 from the sheet portion 11. In the first embodiment, the pulleys 16b to 16f form a first movement unit for moving the sheet portion 11 back and forth in the washing liquid spraying range.

Figure 5:
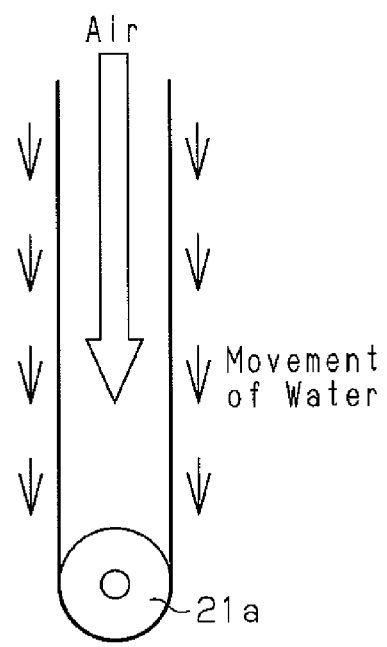
FIG. 5 is a schematic diagram showing a process for blasting air in a drying bath container of the washing apparatus shown in FIG. 2.

The sheet portion 11 from which the residual components of the aqueous solution 14 are washed off is sent to the drying bath container 20 and blasted with air. This blasts away the remaining washing liquid from the sheet portion 11. The pulley 21a moves the sheet portion 11 back and forth between upper and lower positions in an air blasting range. Accordingly, the air blasted from above and the pull of gravity cause the remaining washing liquid on the sheet portion 11 to fall downward along the surface of the sheet portion 11, as shown in FIG. 5. This efficiently removes the washing liquid from the sheet portion 11. In the first embodiment, the pulleys 16g, 21a, and 21b form a second movement unit for moving the sheet portion 11 back and forth in the air blasting range.

The dried sheet portion 11 is then wound into a coil-shaped manner by the winding mechanism 23. Subsequently, various processes and treatments are performed on the washed porous metal substrate to manufacture a positive electrode plate. More specifically, the welding of a lead to the porous metal substrate, the filling of an active material paste, and the cutting of single plates among other processes are performed to manufacture the positive electrode plate. A plurality of positive electrode plates manufactured as described above are used to assemble and manufacture an alkaline battery.

In the first embodiment, the washing apparatus and the washing method of an electrode plate core and the manufacturing method of an alkaline battery have the advantages described below.

(1) In the first embodiment, the washing apparatus includes the liquid bath container 13, which holds aqueous solution for washing off copper and metal impurities, the pulleys 12b to 12f, which guides the sheet portion 11 of porous metal substrate unwound from the hoop 10 and feeds the sheet portion 11 through the aqueous solution in the liquid bath container 13, and the winding mechanism 23, which winds the sheet portion 11 fed through the aqueous solution. The sheet portion 11 of porous metal substrate unwound from the hoop 10 and fed through the liquid bath container 13 is wound by the winding mechanism 23. In the first embodiment, the aqueous solution in the liquid bath container 13 continuously washes off copper from the sheet portion 11 that is unwound from the hoop 10. Since the porous metal substrate is immersed in the aqueous solution in the form of the sheet portion 11, copper and metal impurities are thoroughly and uniformly washed off. The amount of porous metal plate immersed in the aqueous solution is limited. Thus, the exothermic heat generated by chemical reactions is small. This facilitates temperature management of the solution.

(2) In the first embodiment, the washing apparatus includes the pipe 18 for spraying washing liquid that washes off the remaining aqueous solution from the sheet portion 11 fed through the liquid bath container 13. The remaining aqueous solution on the sheet portion 11 is washed off by spraying the washing liquid on the sheet portion 11 that has been fed through the liquid bath container 13. Accordingly, in a continuous manner after washing off copper and metal impurities, the remaining aqueous solution is washed off from the sheet portion 11.

(3) In the first embodiment, the washing apparatus includes the blower 22 for blasting air onto the sheet portion 11 that has been sprayed with washing liquid. The blower 22 blasts air against the sheet portion 11 that is wet by the washing liquid. This removes the remaining washing liquid from the sheet portion 11. Therefore, in a continuous manner after washing off copper and metal impurities and washing off the remaining solution, the sheet portion 11 is dried.

(4) In the first embodiment, the washing apparatus moves the sheet portion 11 back and forth a plurality of times in the aqueous solution of the liquid bath container 13 with the pulleys 12b to 12f. Thus, the aqueous solution is effectively agitated without a separate rotor blade or the like. This lowers the cost of the washing apparatus.

(5) The washing apparatus of the first embodiment moves the sheet portion 11 back and forth in the range in which the pipe 18 sprays the washing liquid. Thus, the sprayed washing liquid falls along the surface of the sheet portion 11. This increases the time of contact between the washing liquid and the sheet portion 11 and improves the washing efficiency of the remaining solution.

(6) In the first embodiment, the washing apparatus moves the sheet portion 11 back and forth in the range in which the blower 22 blasts air. Thus, the remaining washing liquid falls along the surface of the sheet portion 11. This efficiently removes the remaining washing liquid from the sheet portion 11.

(7) In the first embodiment, when manufacturing an alkaline battery including a positive electrode plate with a core formed from a porous metal substrate and carrying active material, the porous metal substrate, which is used as the electrode plate core, is washed as described above. Thus, metal impurities are efficiently washed off from the porous metal substrate. Accordingly, a highly reliable alkaline battery with a positive electrode plate including subtle metal impurities is efficiently manufactured.

Second Embodiment

Figure 6:
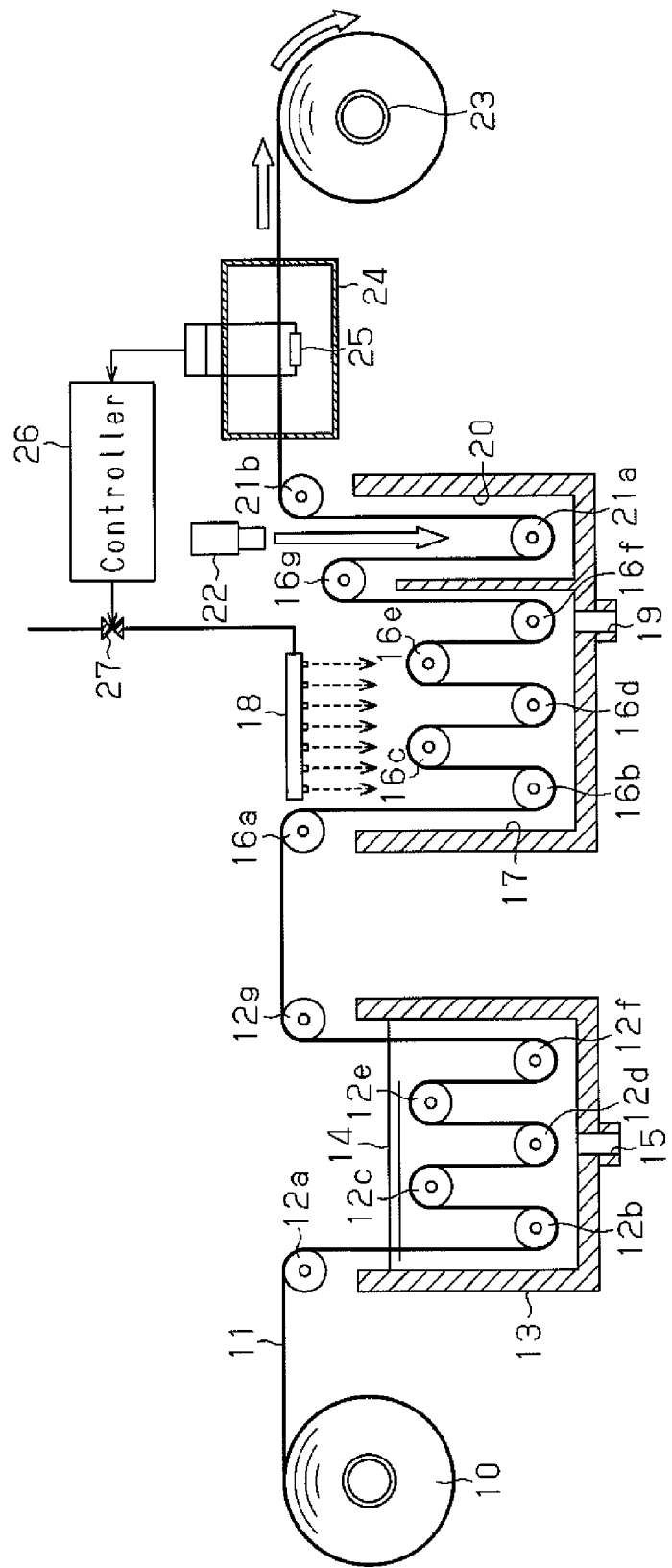
FIG. 6 is a schematic diagram showing a second embodiment of an apparatus for washing an electrode plate core according to the present invention.

A washing apparatus of a second embodiment will be discussed in detail with reference to FIG. 6.

FIG. 5 shows a second embodiment of an apparatus for washing an electrode plate core according to the present invention. In the second embodiment, the sheet portion 11 that has been fed through the drying bath container 20 is fed into a detection chamber 24 before being wound by the winding mechanism 23. The detection chamber 24 is a sealed container. A gas chromatographic device 25 is arranged in the detection chamber 24 to detect the concentration of ammonia volatilized from the sheet portion 11. The amount of residual ammonia components of the aqueous solution on the sheet portion 11 that was not removed when spraying the washing liquid is checked from the detection result of the gas chromatographic device 25. This enables the washing state of the solution to be checked.

The gas chromatographic device 25 provides a detection signal to a controller 26. The controller 26 controls a flow rate control valve 27 that regulates the amount of washing liquid supplied to the pipe 18 based on the detection signal. Specifically, the controller 26 increases the open degree of the flow rate control valve 27 when the ammonia concentration detected by the gas chromatographic device 25 is high thereby indicating that the solution has not been sufficiently washed off. This increases the amount of the washing liquid sprayed onto the sheet portion 11 in the washing bath container 17. The controller 26 reduces the open degree of the flow rate control valve 27 and reduces the amount of the washing liquid sprayed onto the sheet portion 11 in the washing bath container 17 when ammonia is subtly detected thereby indicating that the solution has been sufficiently washed off. Thus, the solution is washed off in an optimal manner.

In the second embodiment, the gas chromatographic device 25, which functions as an analyzer for analyzing the amount of the residual components of the solution, serves as a detection unit for detecting the washing state of the sheet portion 11 after being blasted with air. The controller 26 serves as an adjustment unit for adjusting at least one of the conditions for washing off the metal impurity, the conditions for washing off the solution, and the conditions for drying the sheet portion in accordance with the washing state detected by the detection unit.

In the second embodiment, the washing apparatus has the advantage described below in addition to advantages (1) to (7) of the first embodiment.

(8) In the second embodiment, the washing apparatus uses the gas chromatographic device 25 to detect the amount of residual ammonia components on the sheet portion 11 after being blasted with air and adjusts the amount of the washing liquid sprayed from the pipe 18 into the washing bath container 17 in accordance with the detection result. Thus, if the solution is washed off in an excess manner or an insufficient manner, the conditions for washing off the solution are adjusted so that the solution is washed off from the sheet portion 11 in an optimal manner.

The second embodiment may be modified as described below.

Figure 7:
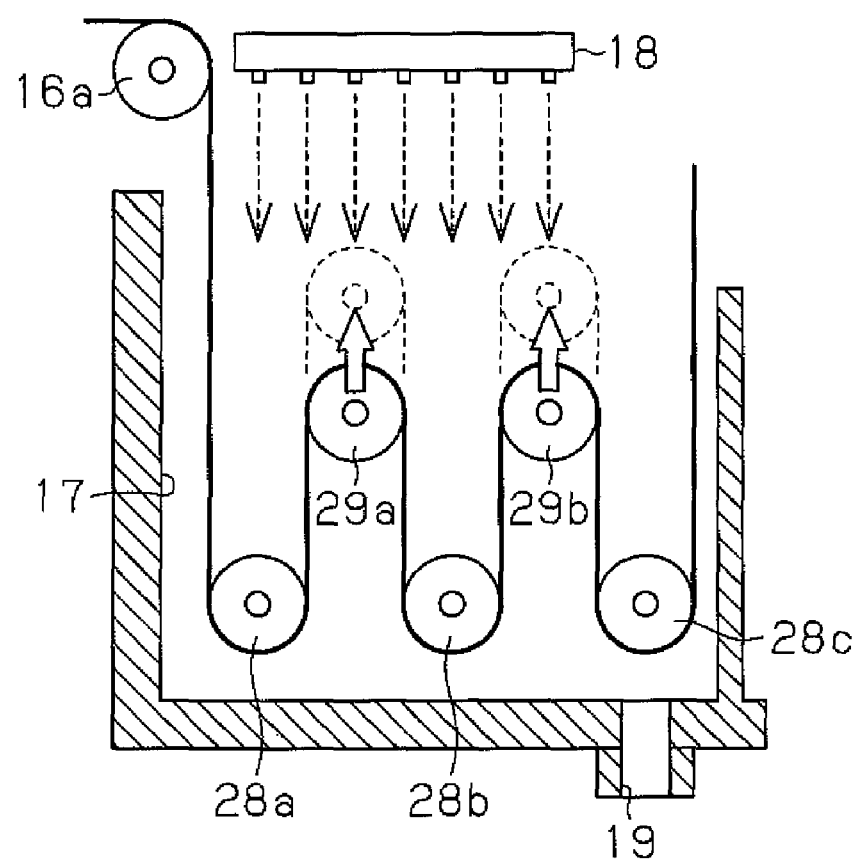
FIG. 7 is a schematic diagram showing a washing bath container in a modification of the second embodiment.

In the second embodiment, instead of adjusting the amount of the washing liquid that is sprayed, the distance in which the sheet portion 11 is moved in the washing liquid spraying range of the washing bath container 17 may be adjusted so that the solution is washed off from the sheet portion 11 in an optimal manner. In this case, the movement distance of the sheet portion 11 may be adjusted, for example, by moving the pulleys arranged in the washing bath container 17. In the example shown in FIG. 7, three pulleys arranged at the lower portion of the washing bath container 17 are fixed pulleys 28a to 28c, and two pulleys arranged at the upper portion of the washing bath container 17 are movable pulleys 29a and 29b that are movable in the vertical direction. In this case, the movement distance of the sheet portion 11 in the washing liquid spraying range may be lengthened or shortened by moving the movable pulleys 29a and 29b in the vertical direction. The movement distance of the sheet portion 11 in the washing liquid spraying range is lengthened by moving the two movable pulleys 29a and 29b upward. The movement distance of the sheet portion 11 in the washing liquid spraying range is shortened by moving the two movable pulleys 29a and 29b downward. Thus, if the solution is not sufficiently washed off, the movement distance of the sheet portion 11 in the washing liquid spraying range is increased to increase the time for washing off the solution. If the solution is washed off in an excessive manner, the movement distance of the sheet portion in the washing liquid spraying range is shortened to decrease the time for washing off the solution. The time for washing off the solution may also be adjusted by changing the movement speed of the sheet portion 11 in the washing liquid spraying range.

In the second embodiment, instead of detecting the amount of residual ammonia on the dried sheet portion 11, for example, the pH and ammonia concentration of the washing liquid discharged from the collection port 19 of the washing bath container 17 may be detected to check the washed off state of the solution. The amount of moisture remaining on the dried sheet portion 11 may also be detected to check whether the drying was sufficient. Based on such detection results, the conditions for washing off copper and performing drying may be adjusted to so that copper is washed off and drying is performed in an optimal manner.

For example, to wash off copper in an optimal manner, the movement distance or the movement speed of the sheet portion 11 in the aqueous solution may be corrected to adjust the time the sheet portion 11 is immersed in the aqueous solution. Copper can also be washed off in an optimal manner by adjusting the temperature or agitation strength of the aqueous solution. Alternatively, the concentration of washing components may be adjusted to adjust the washing power of the aqueous solution. Further, drying may be performed in an optimal manner by adjusting the movement distance or the movement speed of the sheet portion 11 in the air blasting range to adjust the drying time.

The first and second embodiments described above may be modified as described below. In the above embodiments, the aqueous solution may be agitated by using a separate agitator such as a rotor blade.

In such a case, the sheet portion 11 does not have to be moved back and forth and may be moved in one direction.

In the above embodiments, the sheet portion 11 does not have to be moved back and forth in the washing liquid spraying range and the air blasting range as long as the aqueous solution is sufficiently washed off and the sheet portion drying is sufficiently performed.

In the above embodiments, the process for washing off the remaining aqueous solution from the sheet portion 11 and the subsequent process for drying the sheet portion 11 performed in a continuous manner after washing off copper from the sheet portion 11. However, if the processes for washing off the aqueous solution and drying the sheet portion 11 are not necessary or if such processes are separately performed at a later time, just the process for washing off copper from the sheet portion 11 may be performed. For example, the sheet portion fed through the aqueous solution may be directly wound into a hoop, and the processes for washing off the solution and performing drying may be performed on the hoop.

In the above embodiments, an aqueous solution containing ammonium ions and hydrogen peroxide is used as the solution that washes off metal impurities. However, other solutions may be used as required. If the mixing of a metal impurity other than copper becomes a problem, a solution differing from the above aqueous solution may become necessary. In such a case, a washing liquid other than pure water may be used as the washing liquid to wash of the residual components of the solution.

Third Embodiment

A third embodiment of a washing apparatus according to the present invention will now be discussed with reference to FIG. 8.

Figure 8:
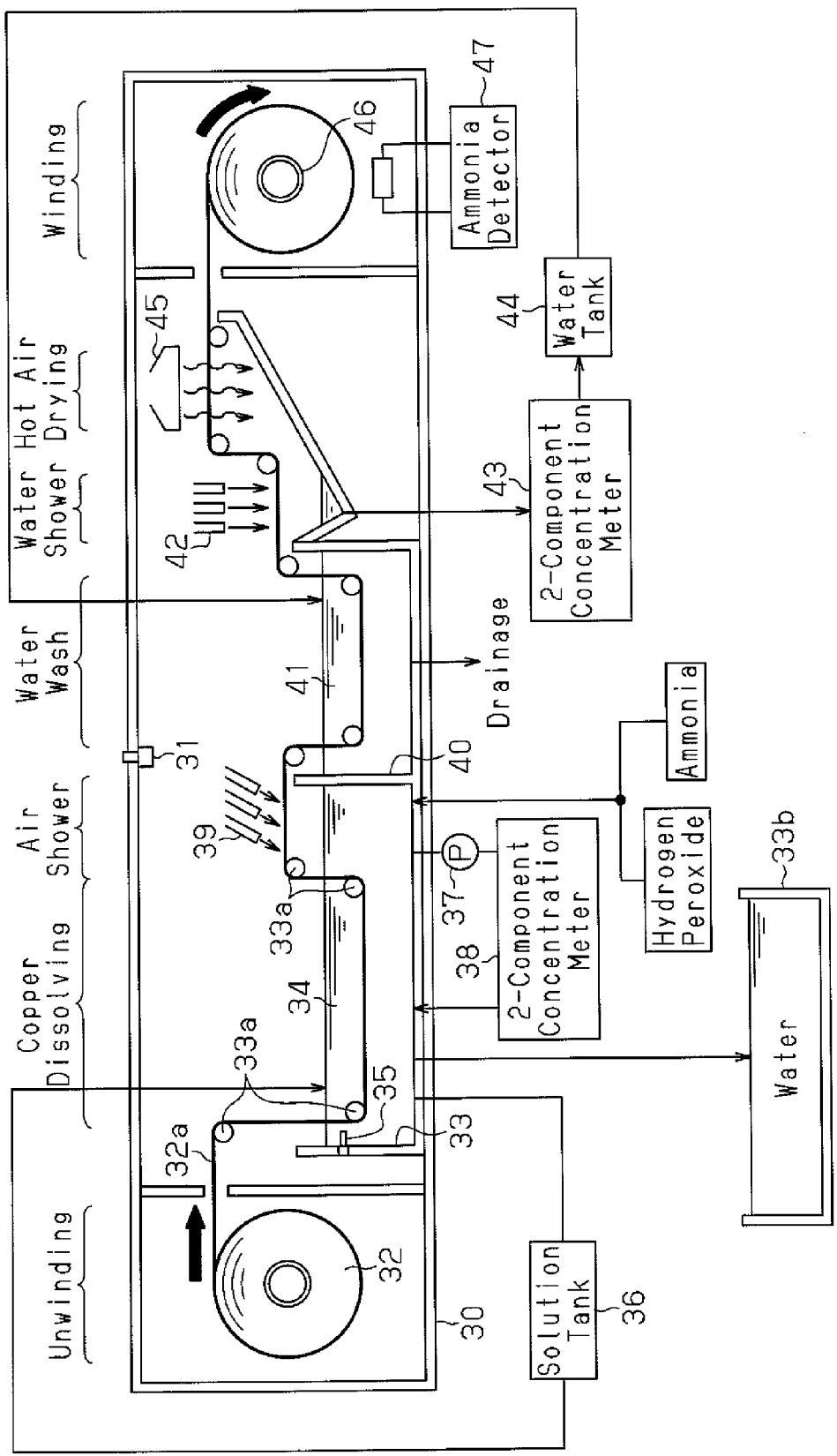
FIG. 8 is a schematic diagram showing a third embodiment of an apparatus for washing an electrode plate core according to the present invention.

FIG. 8 shows the apparatus for washing an electrode plate core in the third embodiment. The washing apparatus is arranged in a sealed chamber 30. The chamber 30 includes a safety valve 31 that releases pressure when the pressure in the chamber 30 becomes too high.

A hoop 32 in which the porous metal substrate is wound in coil-shaped manner is arranged at the left end of the chamber 30, as viewed in FIG. 8. A sheet portion 32*a* of porous metal substrate is sequentially unwound from the hoop 32.

A liquid bath container 33 is arranged at the right side of the hoop 32, as viewed in FIG. 8. The sheet portion 32*a* of porous metal substrate unwound from the hoop 32 is guided by a plurality of pulleys 33*a* and fed through an aqueous solution 34 held in the liquid bath container 33. The aqueous solution 34 contains ammonium ions and hydrogen peroxide.

A thermometer 35 is arranged in the liquid bath container 33. The temperature of the aqueous solution 34 is managed based on the detected temperature of the aqueous solution 34 so that hydrogen peroxide does not decompose. The aqueous solution 34 is constantly circulated between the liquid bath container 33 and a solution tank 36.

A pump 37 delivers some of the aqueous solution 34 in the liquid bath container 33 to a two-component concentration meter 38. The two-component concentration meter 38 detects the concentration of hydrogen peroxide and ammonia in the aqueous solution 34. If the detected concentration indicates that the aqueous solution 34 is diluted, hydrogen peroxide and/or ammonia are added in the liquid bath container 33.

A water bath container 33*b* holding water is arranged near the liquid bath container 33. The water bath container 33*b* forcibly cools the aqueous solution 34 when the aqueous solution 34 suddenly boils.

A plurality of blowers 39 for blasting air are arranged at the upper right side of the liquid bath container 33, as viewed in FIG. 8. The blowers 39 blast away liquid droplet of the aqueous solution 34 from the sheet portion 32*a*.

A water bath container 40 is arranged at the right side of the liquid bath container 33, as viewed in FIG. 8. The sheet portion 32*a* fed through an air shower produced by the blowers 39 is fed through the water 41 in the water bath container 40.

A plurality of nozzles 42 for spraying water are arranged at the upper right side of the water bath container 40, as viewed in FIG. 8. The nozzles 42 spray water against the sheet portion 32*a* fed through the water 41 in the water bath container 40.

The sprayed water (drainage) is collected and sent to a two-component concentration meter 43. The two-component concentration meter 43, which functions as a detection unit for detecting the washed state of the sheet portion 32*a*, measures the concentration of hydrogen peroxide and ammonia in the drainage. Accordingly, the washing state can be checked from the measurement result. If the washing is insufficient, the water 41 in the water bath container 40 is replaced with fresh water from a water tank 44.

A blower 45 for blasting air heated to a high temperature (hot air) is arranged at the right side of the nozzles 42, as viewed in FIG. 8. The blower 45 blasts hot air against the sheet portion 32*a* fed through a water shower produced by the nozzles 42. This dries the sheet portion 32*a*.

A winding mechanism 46 is arranged at the right side of the blower 45, as viewed in the FIG. 8. The winding mechanism 46 rewinds the sheet portion 32*a* dried by hot air in a coil-shaped manner. An ammonia detector 47 (analyzer), such as a gas chromatographic device, for detecting the ammonia concentration in the ambient air is arranged in a portion at which the winding mechanism 46 is arranged. The washing state is checked based on the detection of the ammonia concentration.

The sheet portion 32*a* of the washed porous metal substrate wound by the winding mechanism 46 then undergoes various processes and treatments to manufacture a positive electrode plate. A plurality of positive electrode plates manufactured in this manner are connected to assemble an alkaline battery.

In the third embodiment, the pulley 33*a* serves as a guide. The nozzles 42 serve as a spraying unit, and the blower 45 serves as a drying unit. In the third embodiment, the adjustment unit adjusts the washing conditions of the solution by replacing the water in the water bath container 40 with the water in the water tank 44.

The washing apparatus of the third embodiment has the advantages described below in addition advantages of (1) to (3) and (7) of the first embodiment.

(9) The washing apparatus of the third embodiment includes the water bath container 40 for immersing the sheet portion 32*a* in water before being exposing the sheet portion 32*a* to a water shower produced by the nozzles 42. Accordingly, the residual components of the aqueous solution 34 used to wash off metal impurities is washed off in two stages, namely, the washing in a water bath container and the spraying of a washing liquid (water shower). This increases the washing effects and efficiency.

(10) In the third embodiment, the washing apparatus measures the concentration in the water (drainage) sprayed against the sheet portion 32*a* from the nozzles 42 with the two-component concentration meter 43, which measures pH and ammonia concentration of the drainage. Accordingly, the washing state is indirectly checked based on the concentration measurement.

(11) In the third embodiment after the sheet portion 32*a* is fed through the aqueous solution 34, the washing apparatus blasts away liquid droplets of the aqueous solution 34 from the sheet portion 32*a* with an air shower produced by the blower 39. This effectively removes residual components of the aqueous solution 34 from the sheet portion 32*a*.

(12) In the third embodiment, the washing apparatus dries the sheet portion 32*a* with hot air blasted from the blower 45. This efficiently and effectively dries the sheet portion 32*a*.

(13) In the third embodiment, the washing apparatus separately detects the washing state at two detection locations using the two-component concentration meter 43 and the ammonia detector 47. Thus, the washing state is further accurately checked.

It should be apparent to those skilled in the art that the present invention may be embodied in many other specific forms without departing from the spirit or scope of the invention. Therefore, the present examples and embodiments are to be considered as illustrative and not restrictive, and the invention is not to be limited to the details given herein, but may be modified within the scope and equivalence of the appended claims.

What is claimed is:

1. A washing apparatus for washing off a metal impurity from a porous metal substrate for use as an electrode plate core for an alkaline battery, the washing apparatus comprising:
   a liquid bath container which holds a solution for washing off the metal impurity, wherein the solution contains ammonium ions and hydrogen peroxide;
   a guide which guides movement of the porous metal substrate in the solution held in the liquid bath container, the porous metal substrate being wound into a hoop in a coil-shaped manner, and the guide guiding the movement of a sheet portion of the porous metal substrate unwound from the hoop, wherein the guide includes first and second pulleys over which the sheet portion is sequentially fed up and down in an alternate manner to move the sheet portion back and forth a plurality of times in the solution of the liquid bath container so as to agitate the solution, wherein the first pulley is located at a lower portion of the liquid bath container in the solution, and the second pulley is located at an upper portion of the liquid bath container in the solution;
   a spraying unit for washing off the solution from the sheet portion;
   a drying unit for drying the sheet portion after the solution is washed off from the sheet portion; and
   a winding mechanism which winds the sheet portion that has been fed through the liquid bath container.

2. The washing apparatus according to claim 1, wherein the spraying unit sprays washing liquid for washing off the solution remaining on the sheet portion that has been fed through the liquid bath container.

3. The washing apparatus according to claim 2, wherein the drying unit dries the sheet portion by blasting air against the sheet portion that has been sprayed with the washing liquid.

4. The washing apparatus according to claim 3, further comprising:
   a detection unit which detects a washing state of the sheet portion that has been blasted with the air, wherein the washing state reflects an amount of residual components of the solution on the sheet portion; and
   an adjustment unit which adjusts at least one of conditions for washing off the metal impurity, conditions for washing off the solution, and conditions for drying the sheet portion in accordance with the washing state detected by the detection unit.

5. The washing apparatus according to claim 4, wherein the detection unit includes an analyzer for analyzing the amount of the residual components of the solution on the sheet portion.

6. The washing apparatus according to claim 4, wherein the detection unit includes a two-component concentration meter which measures a concentration of components of the solution in drainage of the washing liquid sprayed from the spraying unit.

7. The washing apparatus according to claim 4, wherein the adjustment unit adjusts the conditions for washing off the solution by adjusting a distance in which the sheet portion moves while the spraying unit sprays the washing liquid on the sheet portion.

8. The washing apparatus according to claim 4, wherein the adjustment unit adjusts the conditions for washing off the solution by adjusting an amount of the washing liquid that is sprayed from the spraying unit.

9. The washing apparatus according to claim 2, further comprising:
   a water bath container for holding water and immersing the sheet portion in water before the sheet portion is sprayed with the washing liquid by the spraying unit.

10. The washing apparatus according to claim 2, further comprising:
    a first movement unit which moves the sheet portion back and forth within a range in which the spraying unit sprays the washing liquid.

11. The washing apparatus according to claim 3, further comprising:
    a second movement unit which moves the sheet portion back and forth within a range in which the drying unit blasts the air.

* * * * *